United States Patent Office 3,474,017
Patented Oct. 21, 1969

3,474,017
PREPARATION OF CYCLOPENTADIENYL METAL OLEFIN COMPOUNDS
Robert P. Werner, Binningen, Basel-Land, Switzerland, assignor to Ethyl Corporation, New York, N.Y., a corporation of Virginia
No Drawing. Original application Apr. 23, 1962, Ser. No. 189,277. Divided and this application May 23, 1966, Ser. No. 565,369
Int. Cl. B01j 1/10
U.S. Cl. 204—162                                2 Claims

ABSTRACT OF THE DISCLOSURE

Process for preparing cyclopentadienyl tantalum and niobium dicarbonyl mono- or di-olefin compounds by reacting the cyclopentadienyl tantalum or niobium tetracarbonyl with a mono- or di-olefin in the presence of mercury and visible irradiation.

---

This application is a division of application Ser. No. 189,277, filed Apr. 23, 1962, now abandoned.

This invention relates to novel organometallic compounds. More particularly, the invention relates to novel cyclopentadienyl carbonyl olefin derivatives of Group VB metals.

An object of this invention is to provide new organometallic compounds. Another object of this invention is to provide organometallic compounds of tantalum and niobium. Still another object is to provide organometallic compounds of tantalum and niobium wherein the tantalum and niobium atom is bonded to a cyclopentadienyl radical, one or two olefin molecules, and carbonyl groups. A further object is to provide an economical method for plating tantalum and niobium on a variety of substrates. Additional objects of this invention will be apparent from the following discussion and claims.

The objects of this invention are accomplished by providing new compounds having the formula $$QM(CO)_2R_x$$

wherein Q is a cyclomatic hydrocarbon radical having 5 to 13 carbon atoms, M is an atom of a Group VB metal of atomic number at least 41, R is an unsaturated hydrocarbon molecule having two to about 13 carbon atoms selected from the class consisting of monoolefins and diolefins, x is equal to two when R is a monoolefin and x is equal to one when R is a diolefin.

The compounds of this invention are decidedly different from those in the prior art. They are derivatives of niobium and tantalum carbonyl which compounds are unknown. They are extremely unstable in the presence of ultraviolet light. This latter property is entirely unexpected since similar compounds of vanadium are prepared by a reaction catalyzed by ultraviolet light. The instability of these compounds toward ultraviolet radiation enhances their utility as sources of niobium and tantalum in vapor phase metal plating.

N. P. Sidgwick, in his work "Chemical Elements and Their Compounds," Oxford University Press, London (1950), states on page 804 that "as is usual in the (B) subgroup, the difference between the first (V) and the second (Nb) member is much greater than that between the second (Nb) and the third (Ta) . . ."

Recent developments in organometallic chemistry have demonstrated that marked differences exist in chemical characteristics between elements of the same group of the Periodic Table. For example, Fischer et al., Z. Naturforsch., 10B, page 598 (1955), have demonstrated that cyclopentadienyl chromium dicarbonyl nitrosyl can be prepared by the reaction of nitric oxide and cyclopentadienyl chromium tricarbonyl dimer. They were unable to extend this reaction to similar compounds of tungsten and molybdenum, the other elements of Group VIB of the Periodic Table.

Vanadium exhibits anomalous chemical characteristics. Vanadium pentoxide is a well-known catalyst for the production of sulfur trioxide from sulfur dioxide and oxygen, and maleic anhydride from benzene. Vanadium carbonyl unexpectedly exists as a monomer, $V(CO)_6$, and is paramagnetic. Sidgwick also enumerates many of the other differences in the chemistry of the Group VB transition metal series.

As mentioned above, the carbonyls of niobium and tantalum are not yet known. The first known carbonyls of these metals were the alkali metal-etherate niobium and tantalum hexacarbonyl compounds.

The metal atoms in the novel compounds of this invention are either niobium or tantalum.

The second constituent of the new compounds of this invention comprises a cyclopentadienyl radical. In general, this constituent can be selected from four types of radicals having up to about 13 carbon atoms, all incorporating the cyclopentadienyl configuration.

Hence, the cyclopentadienyl radical may be the cyclopentadienyl radical or the cyclopentadienyl radical substituted with univalent hydrocarbon radicals such as alkyl, alkenyl, aralkyl, aralkenyl, cycloalkyl, and cycloalkenyl radicals. The univalent radicals which may be substituted on the cyclopentadienyl ring may have one to about 8 carbon atoms. Thus, such radicals as the methyl, isopropyl, tertiary butyl, benzyl, α-phenylethyl, phenyl, β-ethylphenyl, cycloamyl, cyclohexyl ethyl, and α-cyclohexyl ethenyl radicals and the like may appear as substituents on the cyclopentadienyl ring. The cyclopentadienyl ring may be polysubstituted. However, the total number of carbon atoms within the ring plus the carbon atoms of the substituent radicals is no higher than about 13.

The second type of cyclomatic radical is the indenyl radical represented by the general formula

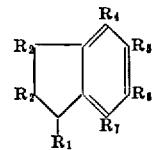

wherein each of the R groups can be the same or different and is selected from the group consisting of hydrogen and organic radicals. Illustrative examples of such cyclomatic radicals are idenyl, 3,4-diethylindenyl, 3-phenylindenyl, and the like.

The third type of cyclomatic radical which may be incorporated within the new compositions of matter in the instant invention is a radical or the fluorenyl type which can be represented by the general formula

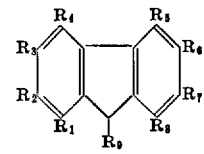

Again, each of the R groups in the above formula can be alike or different and is selected from the class consisting of hydrogen and organic radicals, similar to those described above. Thus, radicals such as the fluorenyl, the 3-ethyl fluorenyl, the 4,5-dimethyl fluorenyl radicals and the like are applicable in this invention.

The fourth type of cyclomatic radical can be represented by the general formula

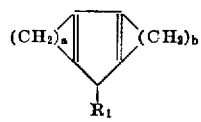

wherein $a$ and $b$ can be the same or different and are small whole integers including zero and excluding one, and wherein $R_1$ is selected from the class consisting of hydrogen and organic radicals. Illusrtative examples of this type of radical which contains the cyclopentadienyl configuration include 4,5,6,7-tetrahydroindenyl, 1,2,3,4,5,6,7,8-octahydrofluoroenyl, 6-methyl, 4,5,6,7-tetrahydroindenyl, and the like.

The fourth constituent of the new compounds of this invention is an olefin molecule. The olefinic constituent can be chosen from a wide variety of unsaturated olefinic molecules. The exact limit of the molecular size of the olefin employed has not been determined. It is apparent, however, that some olefins are so large and so bulky that it is not possible for them to bond to the tantalum or niobium atom, or the solubility characteristics of the product are so altered that the product cannot be isolated from the solvent. For this reason, we prefer to use olefinic molecules having 2 to about 13 carbon atoms. We have found these molecules to be well suited in the process of this invention inasmuch as the corresponding novel compounds derived from them are readily prepared and these molecules are commercially available. However, such a compound as tetraphenyl cyclopentadienone, which contains 29 carbon atoms, can form the derivatives, cyclopentadienyl tantalum (or niobium) dicarbonyl tetraphenyl cyclopentadienone.

When a monolefin is employed, two equivalents of the olefin displace one carbon monoxide moiety from the starting material and form a compound such as cyclopentadienyl tantalum (or niobium) dicarbonyl di-heptene-1). Of the monoolefins, such compounds as heptene-1, hexene-1, and ethylene are preferred, since these compounds are readily available. It is to be understood, however, that higher derivatives such as nonene-1 can also be employed. Similarly, cyclic monoolefinic molecules such as cyclohexene are applicable in the instant invention. Hydrocarbon substituted cyclohexenes containing either one or as many as six hydrocarbon radicals appended to the ring can also be employed. Thus, compounds such as 1-methylcyclohexene, 1,2,3,4,5,6-hexamethylcyclohexene, 2-octylcyclohexene, and the like can be employed. The nature of the hydrocarbon substituent appended to the ring is not critical. Therefore, substituted cyclohexenes having up to about 13 carbon atoms are applicable in this invention.

In many instances, it is possible to utilize a monoolefinic molecule which contains substituents such as halogen, carboxy, keto groups and the like. However, the olefinic hydrocarbon compounds are preferred because of their commercial availability.

The diolefinic molecules of this invention are preferably conjugated diolefins. Such compounds as butadiene and 2,3-dimethylbutadiene are examples of applicable conjugated diolefins.

Cyclic diolefins can also be employed. Compounds such as 1,3-cyclohexadiene, cyclopentadiene and hydrocarbon derivatives thereof are applicable. Thus, such compounds as 2-butyl-1,3-cyclohexadiene and 2-octyl cyclopentadiene readily form compounds of the class disclosed in this invention. More highly substituted cyclic diolefins are likewise applicable. Thus, 1,3,5-tributyl, 1,3-cyclohexadiene can be employed. The substituents on the ring may also be aromatic in nature. An example of this type of compound was exemplified by tetraphenylcyclopentadienone mentioned above. Other substituents other than hydrocarbon substituents can appear within the diolefinic molecule.

Again, such substituents as halogen, keto and carboxy groups may be present. It has been found that the identity of these non-hydrocarbon substituents is not critical. Diolefinic molecules containing non-hydrocarbon substituents such as ethyl sorbate, sorbonitrile and vinylacrylic acid can be employed.

The compounds of this invention are produced by reacting organometallic complexes having the formula $QM(CO)_4$, wherein Q is selected from the class consisting of the cyclopentadienyl radical and hydrocarbon substituted cyclopentadienyl radicals having five to about 13 carbon atoms and M is an atom of niobium or tantalum, with an olefin in the presence of mercury and visible irradiation. The following example, wherein all parts are by weight, illustrates the preparation of a starting material used in the process of this invention.

EXAMPLE I

Preparation of cyclopentadienyl tantalum tetracarbonyl

A solution of 1.65 parts of cyclopentadienyl sodium in 100 parts of dimethoxyethane was poured into a suitable reaction vessel (previously swept with nitrogen) equipped with heating, stirring and condensing means, a gas trap, and liquid inlet means. While stirring the solution, 5.1 parts of $HgCl_2$ dissolved in 50 parts of dimethoxyethane was added to the vessel. While stirring and maintaining the mixture under nitrogen at 25° C., 8 parts of tris(dimethoxyethane) sodium hexacarbonyl tantalum (−1) was slowly added to the mixture. The addition was complete after two hours. The reaction mixture was filtered under nitrogen. The solvent was then removed using a rotary evaporator and the residual solids were extracted with water. The mixture was filtered under nitrogen and the precipitate washed several times with water. The precipitate was then extracted with ether and the ether solution filtered under nitrogen, yielding a clear orange solution. Evaporation of the ether and subsequent sublimination at 105° C. and 0.1 mm. Hg afforded large red crystals. They were washed with a few milliliters of cold petroleum ether and dried. The ruby red crystals were stable in air for several days. They melted under nitrogen at 171–173° C. The compound was soluble in most organic solvents, such as ether, petroleum ether, benzene, and carbon disulfide, and its solutions were unstable in air. In carbon disulfide, its infrared spectra exhibited bands at 1900 and 2020 cm.$^{-1}$. The compound, cyclopentadienyl tantalum tetracarbonyl, as shown by magnetic susceptibility measurements, is diamagnetic.

*Analysis.*—Calculated for $C_9H_5O_4Ta$: C, 30.19%; H, 1.41%; Ta, 50.52%. Found: C, 29.9%; H, 1.48%, Ta, 50.56.

Similarly, methylcyclopentadienyl sodium, 2-ethyl-3-propylcyclopentadienyl sodium and 2-methylindenyl sodium yield the corresponding tantalum complexes, methylcyclopentadienyl tantalum tetracarbonyl, 2-ethyl-3-propylcyclopentadienyl tantalum tetracarbonyl and 2-methylindenyl tantalum tetracarbonyl. Analogous niobium compounds are produced in the same manner.

The cyclopentadienyl niobium and tantalum tetracarbonyl compounds used as starting materials are the source of the cyclopentadienyl radical, the metal and the two carbonyl radicals that appear in the new products. Thus, a judicious choice of this starting material governs the nature of the cyclopentadienyl ring and the metal which appears in the new compounds formed by our novel process. The tetracarbonyl starting material reacts with various olefins to form the corresponding olefinic derivatives by a displacement of a substantially stoichiometric equivalent of carbon monoxide.

The displacement reaction can be carried out either with or without a solvent. I prefer to use a solvent when working with a high boiling olefin. The solvent affords a homogenous reaction mixture and prevents local superheating and consequent destruction of the olefinic reactant. It is preferred that the solvent employed is nonreactive toward either the products or the reactants. Hydrocarbon aprotic solvents such as heptane, hexane, and ligroin are examples of solvents which may be employed. Other solvents such as dimethoxyethane, diethyleneglycol dimethylether can also be employed.

Besides being non-reactive, it is preferred that the solvent used in this invention readily dissolve the starting materials. We also prefer solvents that are not so nonvolatile so as be unduly prolong or hinder the solvent removal step utilized in the subsequent separation procedure. Thus, we prefer to use a solvent with suitable boiling and freezing points. It is preferred that the solvent does not boil below the desired reaction temperature and that it is a liquid at room temperature or the temperature used in the subsequent isolation step.

In many instances, a large excess of olefinic reactant is employed as a solvent. Thus, such reactants as 1-hexene and 1,3-cyclohexadiene are suitable solvents since they readily dissolve the cyclopentadienyl metal carbonyl starting material and have melting and freezing points within the desired range.

The reaction proceeds smoothly at atmospheric pressure. However, pressures as low as 0.10 and as high as 150 atmospheres can be utilized. We prefer to use a pressure range from about 0.5 to about 1.3 atmospheres.

This displacement process can be conducted at a temperature within the range of about 0° to about 150° C. A preferred temperature range is from about 15 to about 120° C. This preferred range enables the reaction to be completed after a suitable time. The products are formed in optimum yield if a temperature in this range is employed.

The process is catalyzed by a trace amount of mercury metal. When a mercuric salt such as mercuric chloride is utilized as the oxidant in the preparation of the cyclopentadienyl tantalum or niobium tetracarbonyl starting compound, mercury metal is concurrently formed. Thus, the starting material contaminated with mercury can be efficaciously employed in the process of this invention. Thus, very careful purification techniques are not necessary when preparing the starting material according to the process utilized in Example I.

The reaction rate is likewise enhanced if agitation of the reaction mixture is employed. We prefer to use agitation for this reason; however, agitation is not essential.

The reaction rate is also enhanced if the reaction mixture is externally irradiated by visible light. As demonstrated by Example III, ultraviolet light caused extensive decomposition of the reactants and no product could be isolated. It has been found that the reaction rate assumes reasonable magnitude only after visible irradiation of the reaction mixture. As demonstrated in Example IV, the reaction was not initiated until the visible light source was turned on. The presence of an increased amount of visible irradiation over and above that utilized affecting completion of the reaction does not effect the reaction adversely or enhance it appreciably.

The time of the reaction is not a truly independent variable. The reaction can be unduly prolonged if a pressure or temperature below the ranges given above is employed. In like manner, when irradiation and/or catalysis are not employed, the reaction time is too long to be feasible. Thirdly, if agitation is not employed, the time of reaction is increased. Those conditions which enable the reaction to be complete in a time from about two hours to about 20 hours are suitable. However, a reaction time of from about 3 to about 10 hours is preferred.

The course of the reaction can be followed by measuring the amount of carbon monoxide evolved. We prefer to measure the amount of gas manometrically or volumetrically. Volume measurements are most preferred because of the simplicity of the equipment required in this technique. Hence, during the course of the reaction, an increment of volume of gas evolved will be observed. When the rate of volume increase per unit time approaches zero, the reaction is deemed complete.

The products of this reaction can be isolated by ordinary means. For example, distillation of the solvent, extraction, or precipitation of the product through the addition of another solvent in which the product is immiscible. Suitable solvents for this technique are the protic solvents such as alcohols, ketones and the like. We prefer to isolate the product by removal of the solvent and a reduced temperature and pressure because this procedure facilitates the subsequent isolation of the purification steps.

Once the crude product is isolated from the reaction mixture by the technique described above, can be purified by ordinary means apparent to one skilled in the art. Extraction, fractional crystallization, sublimation, chromatography and the like are suitable procedures. We prefer to sublime the crude product because a pure product is obtained in high yield with a minimum amount of manipulation and supervision.

To further illustrate the process for the preparation of olefinic derivatives of the cyclopentadienyl niobium and tantalum dicarbonyl olefinic compounds, the following examples are presented. All parts and percentages are by weight unless otherwise noted.

EXAMPLE II

Preparation of cyclopentadienyl butadiene tantalum dicarbonyl

Into a suitable reaction vessel equipped with heating, stirring and condensing means, was placed a solution of 4.2 parts of cyclopentadienyl tantalum tetracarbonyl dissolved in 70 parts of n-heptane. The condensing means was connected to a mercury check valve. The end of the gas inlet tube was inserted below the level of the liquid. About 25 parts of butadiene was introduced into the reaction mixture via the gas inlet device. After adding a trace of mercury, the mixture was stirred and irradiated externally with a visible light source. The reaction mixture was maintained at 25–30° C. for about six hours. After this time the reaction was deemed complete because of the amount of gas evolved. The stirring and irradiation were then discontinued. The solution was filtered and the filtrate evaporated to dryness using reduced pressure and a flash evaporator. The product, cyclopentadienyl tantalum dicarbonyl butadiene was obtained in a yield of 57 percent. The orange crystals melted in a sealed capillary under nitrogen at 126–127° C. The infrared spectrum contained absorption maxima typical for carbon monoxide occurring at 1890 and 1961 cms.$^{-1}$. The compound was soluble in common organic solvents such as carbon disulfide, benzene, petroleum ether and the like.

EXAMPLE III

A suitable three-necked flask was fitted with a Dry Ice condenser and a nitrogen inlet. The flask was charged with 28 parts of n-heptane and 0.7 part of cyclopentadienyl tantalum tetracarbonyl. A small trace of mercury was added to this mixture and about 20 parts of butadiene was bubbled in with stirring. Upon completion of the addition of the butadiene, the mixture was externally irradiated with an ultraviolet source for two and one-half hours. Rapid evolution of gas occurred and a yellow precipitate was formed. Only a trace amount of orange crystalline product, cyclopentadienyl tantalum dicarbonyl butadiene, was obtained upon sublimation after removal of the solvent in vacuo.

EXAMPLE IV

A suitable three-necked flask was fitted with a Dry Ice condenser and nitrogen inlet. The Dry Ice condenser was connected to a gas collection apparatus through a suitable mercury check valve. The flask was flushed with nitrogen and then charged with 1.4 parts of cyclopentadienyl tantalum tetracarbonyl, 60 parts n-heptane and a trace of mercury. The solution was then saturated with butadiene. Thereafter, the mixture was stirred for one-half hour. No gas evolution was noted. Then the mixture was irradiated with visible light for 2½ hours. Gas evolution was rapid and promptly commenced after activation of the external light source. During the 2½ hour period, the solution turned from deep red to orange and at one point, more butadiene was added to compensate for evaporation. After solvent removal and two resublimations, 0.25 part of cyclopentadienyl tantalum dicarbonyl butadiene was obtained.

*Analysis.*—Calculated for $C_{11}H_{11}O_2Ta$: C, 37.10; H, 3.11. Found: C, 37.6; H, 3.36.

EXAMPLE V

The procedure of Example II is followed except that 2,3-dimethylbutadiene is used in place of butadiene. The reaction mixture is maintained at a temperature of 60–70° C. for three hours. The product is cyclopentadienyl tantalum dicarbonyl 2,3-dimethylbutadiene. The corresponding niobium derivative can be prepared by a similar reaction. Similarly, dimethylcyclopentadienyl tantalum dicarbonyl 2,3-dimethylbutadiene is prepared when dimethylcyclopentadienyl tantalum tetracarbonyl is used as the starting product.

EXAMPLE VI

The procedure of Example II is followed except that 1,3-cyclohexadiene is used both as a reactant and as a solvent. A reaction temperature of 70–80° C. is maintained for five hours. The product is cyclopentadienyl tantalum dicarbonyl 1,3-cyclohexadiene.

EXAMPLE VII

The procedure of Example II is followed except that tetraphenyl cyclopentadienone is substituted for butadiene and isooctane is used as the solvent. The reaction mixture is maintained at 80–105° C. for seven hours. The product is cyclopentadienyl tantalum dicarbonyl tetraphenyl cyclopentadienone. The corresponding niobium compound can be prepared by a similar reaction.

Following the same procedure as outlined above, indenyl tantalum dicarbonyl tetraphenyl cyclopentadienone, indenyl niobium dicarbonyl ethylsorbate, and 5,6-dimethylindenyl niobium dicarbonyl 2,3-dimethylbutadiene are prepared.

EXAMPLE VIII

The procedure of Example II is followed except that heptene-1 is used as the reactant and solvent. The reaction mixture is maintained at 70–80° C. for six hours. The product is cyclopentadienyl tantalum dicarbonyl diheptene-1. Dibutylcyclopentadienyl niobium dicarbonyl diheptene-1, fluorenyl niobium dicarbonyl diheptene-1 are prepared by a similar procedure.

EXAMPLE IX

When ethylene is used in place of butadiene in Example II, the product is cyclopentadienyl tantalum dicarbonyl diethylene.

EXAMPLE X

Vapor phase plating of a steel with cyclopentadienyl tantalum butadiene dicarbonyl A suitable quantity of cyclopentadienyl tantalum dicarbonyl butadiene was placed in a reservoir equipped with heating means. The reservoir was connected through a valve to a plating chamber wherein the object to be plated, a steel plate, was supported. The steel plate was connected to a temperature measuring device. The plating chamber was equipped with an induction coil which surrounded the metal object to be plated. The plating chamber was connected to a cold trap downstream from the reservoir and the cold trap was connected to a vacuum pump. The system was evacuated to a pressure less than 0.2 mm. of mercury. The reservoir was sufficiently heated to volatilize the cyclopentadienyl tantalum dicarbonyl butadiene and to provide a steady continuous evolution of that compound. The temperature of the steel plate was raised to 400–550° C.

Upon contact of the vapor with the hot steel plate, a metallic tantalum-containing deposit was deposited on the plate. The organic vapors resulting from the decomposition of the plating compound together with the unused plating compound were collected in the cold trap. The unused material was recovered by suitable extraction and crystallization and used in another run.

Similarly, a metallic tantalum containing deposit is prepared when the reservoir containing the cyclopentadienyl tantalum dicarbonyl butadiene is also irradiated with ultraviolet light.

Any material which can withstand a temperature of about 400° C. can be plated with a tantalum or niobium containing deposit using this technique. Iron, copper, bronze, brass, chromium and various porcelains and other ceramics can be coated.

As mentioned previously, an object of this invention is to provide an improved method for plating tantalum and niobium on a diversity of substrates. A further object is to provide a more efficient and effective method for plating tantalum in an economical manner.

The above and other objects are accomplished by a process for plating a Group VB metal upon a substrate which comprises thermally decomposing a vapor consisting essentially of the cyclopentadienyl dicarbonyl olefinic compound of niobium and tantalum in contact with said substrate wherein said process is conducted at a temperature of from about 200° C. to about 600° C., and at a pressure of from about 0.01 mm. to about 10 mm. of mercury. The objects set out hereinabove are further accomplished by a process for plating tantalum or niobium on a substrate which comprises heating said substrate to a temperature of between about 200° C. to about 500° C. and contacting a vapor consisting essentially of one of the compounds prepared by the process of this invention with said substrate wherein said contacting is carried out at a pressure of between about 0.01 mm. to about 10 mm. of mercury.

The deposition chamber pressure may range from about 0.001 mm. of mercury to about 30 mm. of mercury. The preferred pressure in the deposition chamber is from about 0.01 to about 10 mm. of mercury since better plates are obtained within this pressure range and transportation of the plating vapor is facilitated. The most preferred pressure range is from about 0.01 to about 0.5 mm. of mercury since better results are obtained within this range.

The temperature conditions coupled with pressure in the plating chamber forms the critical feature of the present process. Thus, where the temperature ranges from about 200° C. to about 600° C. preferably 400° C. to 550° C., and the pressure in the chamber ranges from about 0.01 to about 10 mm. of mercury, better plates are obtained having better adherence to the substrate and pinhole free surfaces.

In the process of this invention a carrier gas is not required or desirable. Generally carrier gases tend to react with the niobium or tantalum being plated to form carbides, nitrides or other products as the metal is deposited upon the substrate. Furthermore, carrier gases usually contain small amounts of impurities which ultimately effect the plating process. Hence, a carrier gas is not generally used in the process of this invention and is preferably avoided. However, under some circumstances, because of the more improved plates obtained by the unique combination of temperature and pressure conditions of this invention, carrier gases such as hydrogen, carbon dioxide, nitrogen and argon may be tolerated and used to facilitate the flow of the vaporized plating compound.

In initially vaporizing the plating compound prior to its use in the actual plating operation, temperatures from about 100° C. to about 200° C. may be used. It is preferred, however, to vaporize the cyclopentadienyl tantalum or niobium tetracarbonyl compound at temperatures from about 150° C. to about 200° C. Lower vaporization temperatures can be used when the plating compound is irradiated with ultraviolet light. Hence, the flow rate desired can be achieved by a less efficient heating source. The temperature used depends on the flow rate desired.

The flow rate of the niobium or tantalum dicarbonyl olefin vapor is dependent to a certain extent upon the amount of pressure in the plating chamber and the temperature to which the compound is subjected. Ordinarily, the flow rates of the plating compound employed vary from about one foot per minute to about 30 feet per second although faster or slower rates can be employed.

The time required to plate the tantalum or niobium by the process of this invention varies over a wide range, depending on flow rate, desired coating thickness, deposition chamber pressure, temperature of the substrate and the vaporization temperature of the plating compound. However, times from about 15 minutes to about 10 hours are generally acceptable. For economic reasons, it is preferred, however, that the process time range from about 30 minutes to about 3 hours, depending on the desired thickness of the chromium coating.

Well adherent niobium and tantalum metal coatings can be obtained through depositing its vapor directly upon any substrate that can withstand the plating conditions. Typical examples of substrates which may be plated are nickel, Pyrex glass, beryllium, molybdenum, graphite, ceramics, high-temperature resistant plastics, and the like. The preferred substrates which can be plated are ferrous metal substrates, aluminum and the like.

In some cases, the substrate to be plated is preferably subjected to initial preparation. This is especially true in the case of metal substrates. In other words, the degree of adherence achieved through the unique vapor plating process of this invention, in some instances where desirable, can be further improved by an appropriate metal surface pre-treatment. The best metal surface preparation is achieved through degreasing with a solvent such as 1,1,2-trichloroethylene or the like followed by light sandblasting. The vapor plated coatings have even better adherence on slightly uneven surfaces, such as created by sandblasting, than on highly polished substrates. Thus, not desiring to be bound by theoretical considerations, it is felt that sandblasting permits a better anchoring effect of the deposited metal which penetrates into the small pits of the surface. On substrates such as graphite and ceramics where the surface is already non-uniform, if desired, degreasing can be performed to assure a clean plating surface. Other substrate pre-treatments known to the art can be employed if desired, and will now be evident for the above and other substrates.

The types of apparatus which may be used for the plating operation are any of the apparatus described in the prior art, such as set forth by Lander and Germer in "Plating Molybdenum, Tungsten and Chromium by Thermal Deposition of Their Carbonyls," or by Powell, Campbell and Gonser in the book "Vapor Plating," John Wiley and Sons, New York, 1955, wherein a vacuum chamber is used.

Heating may be achieved by numerous methods. Generally, resistance heating, infrared heating or induction heating are used according to the nature of the substrate and the type of equipment which is employed since the equipment largely determines the heat requirements. Flat samples such as metal plates can generally be heated by resistance heating apparatus such as a hot plate. For uneven shaped objects, induction heating or infrared heating may be used, depending on the nature of the substrate.

For the plating operation of this invention, the object to be plated is heated to a temperature of 250 to 550° C. preferably 300 to 450° C. in an enclosed chamber. The system is evacuated and the plating agent is heated to an appropriate temperature wherein it possesses vapor pressure of preferably up to about 5 mm. of mercury. In most instances, the process is conducted at no lower than 0.01 mm. mercury pressure. The vapors of the plating agent are pulled through the system as the vacuum pump operates, and they impinge on the heated object, decomposing and forming the metallic coating.

In addition to the thermal decomposition techniques discussed hereinabove, for decomposing the plating agents of this invention, other methods for decomposition can be employed. Such methods are decomposition of a niobium or tantalum compound by ultrasonic frequency or as previously mentioned, by ultraviolet irradiation. The former process involves essentially the same procedure as employed in Example VIII with the exception that an ultrasonic generator is proximately positioned to the plating apparatus. The niobium or tantalum compound is then heated to its decomposition threshold and thereafter the ultrasonic generator is utilized to effect final decomposition. Decomposition by ultraviolet irradiation involves essentially the same method as utilized in Example VIII with the exception that in place of the resistance furnace there is utilized for heating a battery of ultraviolet and infrared lamps placed circumferentially around the outside of the heating chamber. The substrate to be heated is brought to a temperature just below the decomposition temperature of the niobium or tantalum plating agent with the infrared heating and thereafter decomposition is effected with ultraviolet rays.

Although the above techniques generally employ the niobium or tantalum plating agent in its vapor phase, other techniques besides vapor phase plating can be employed. For example, the substrate to be plated can be placed in a decomposition chamber and the plating agent packed in contact with the element and thereafter heated to a temperature above the decomposition temperature of the plating agent. The volatile by-products of the decomposition reaction escape leaving an adherent deposit on the substrate.

Deposition of metal on a glass cloth illustrates the latter process. A glass cloth band weighing one gram is dried for one hour in an oven at 150° C. It is then placed in a tube which is devoid of air and theer is added to the tube 0.5 gram of cyclopentadienyl tantalum dicarbonyl butadiene. The tube is heated at 400° C. for one hour after which time the tube is cooled and opened. The cloth has a uniform metallic grey appearance and exhibits a gain in weight of about 0.02 gram. The cloth has greatly decreased resistivity and each individual fiber proves to be a conductor. An application of current to the cloth causes an increase in its temperature. Thus, a conducting cloth is prepared. This cloth can be used to reduce static electricity, for decoration, for thermal insulation by reflection, and as a heating element.

These new compounds of this invention are useful antiknocks when added to a petroleum hydrocarbon. Further, they may be used as supplemental antiknocks, that is, in addition to a lead antiknock already present in the fuel. Typical lead antiknocks are the lead alkyls such as tetraethyllead, tetrabutyllead, tetramethyllead and various mixed alkyls such as dimethyldiethyllead, diethyldibutyllead and the like. When used as an antiknock, these compounds may be present in the gasoline in combination with typical halogen scavengers such as ethylene dichloride, ethylene dibromide and the like.

The novel compounds of this invention are particularly useful as chemical intermediates, fuel and lubricating oil additives, polymerization catalysts, combustion control additives, fungicides, herbicides, pesticides, and bactericides.

Having fully described the novel compounds of our invention, their utilities and the methods used in preparing the compounds, it is desired that this invention be limited only within the scope of he appended claims.

I claim:
1. Process for the formation of compounds having the formula:

$$QM(CO)_2R_x$$

wherein Q is a cyclomatic hydrocarbon radical having 5–13 carbon atoms, M is a Group VB metal atom of atomic number of at least 41, R is an unsaturated hydrocarbon molecule having 2 to about 13 carbon atoms selected from the class consisting of monoolefins and diolefins, $x$ is equal to 2 when R is a monoolefin, and $x$ is equal to one when R is a diolefin, said process comprising reacting organometallic complexes having the formula:

$$QM(CO)_4$$

wherein Q and M are as defined above, with an olefin having 2 to about 13 carbon atoms selected from the class consisting of monoolefins and diolefins, in the presence of mercury and visible irradiation.

2. The process of claim 1 wherein Q is a cyclopentadienyl radical, M is tantalum, and R is butadiene.

References Cited
UNITED STATES PATENTS

| | | | |
|---|---|---|---|
| 3,288,829 | 11/1966 | Wilkinson | 204—158 X |
| 3,361,779 | 1/1968 | Coffield et al. | 260—429 |

HOWARD S. WILLIAMS, Primary Examiner

U.S. Cl. X.R.

204—158

PO-1050
(5/69)

UNITED STATES PATENT OFFICE
CERTIFICATE OF CORRECTION

Patent No. 3,474,017     Dated October 21, 1969

Inventor(s) Robert P. M. Werner

It is certified that error appears in the above-identified patent and that said Letters Patent are hereby corrected as shown below:

Column 2, the left-hand portion of the first formula shou read:

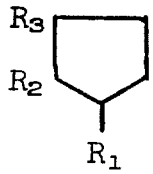

Column 2, line 52, "idenyl" should read --indenyl--; Column 3 line 15, "hydrofluoroenyl" should read --hydrofluorenyl--;
Column 3, line 36, "monolefin" should read --monoolefin--;
Column 5, line 10, "be" should read --to--; Column 6, line 14 insert --it-- before "can"; Column 10, line 43, "theer" shoul( read --there--; Column 10, line 75, "he" should read --the--

SIGNED AND
SEALED

JUN 16 1970

(SEAL)
Attest:

Edward M. Fletcher, Jr.

Attesting Officer

WILLIAM E. SCHUYLER, JR.
Commissioner of Patents